US010635770B1

(12) United States Patent
Wu et al.

(10) Patent No.: US 10,635,770 B1
(45) Date of Patent: Apr. 28, 2020

(54) METHODS, SYSTEMS, AND COMPUTER PROGRAM PRODUCTS FOR IMPLEMENTING AN ELECTRONIC DESIGN WITH HYBRID ANALYSIS TECHNIQUES

(71) Applicant: Cadence Design Systems, Inc., San Jose, CA (US)

(72) Inventors: Xiaohai Wu, Fremont, CA (US); Roland Ruehl, San Carlos, CA (US); Tao Hu, Fremont, CA (US); Walter Ghijsen, San Jose, CA (US); Yujia Li, Santa Clara, CA (US); An-Chang Deng, Saratoga, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/024,844

(22) Filed: Jun. 30, 2018

(51) Int. Cl.
G06F 17/50 (2006.01)

(52) U.S. Cl.
CPC ........ *G06F 17/505* (2013.01); *G06F 2217/02* (2013.01)

(58) Field of Classification Search
CPC . H03K 19/17736; H01L 23/528; G06F 13/16; G06F 13/4068; G06F 13/4265; G06F 17/5022; G06F 17/5009; G06F 17/5036; G06F 17/505; G06F 17/5045; G06F 17/5072; G06F 17/5077; G06F 17/5086; G06F 2217/02; G06F 2217/04; G06F 2217/66; G06F 2217/74; G06F 2217/86; G06F 17/211; G06F 17/2241; G06F 17/5031; G06F 17/5068; G06F 17/5081; G06F 2217/84

USPC .................................................. 716/100–106
See application file for complete search history.

(56) References Cited

U.S. PATENT DOCUMENTS

| 5,880,967 | A | 3/1999 | Jyu et al. |
|---|---|---|---|
| 6,209,122 | B1 | 3/2001 | Jyu et al. |
| 6,577,992 | B1 | 6/2003 | Tcherniaev et al. |
| 6,820,243 | B1 | 11/2004 | Shey et al. |
| 7,409,656 | B1 | 8/2008 | Ruehl |
| 7,657,856 | B1 | 2/2010 | Koshy et al. |
| 7,689,948 | B1 | 3/2010 | White et al. |
| 7,707,528 | B1 | 4/2010 | White et al. |
| 7,725,845 | B1 | 5/2010 | White et al. |
| 7,886,243 | B1 | 2/2011 | Gumaste et al. |
| 7,904,852 | B1 | 3/2011 | Cadouri et al. |
| 7,984,399 | B1 | 7/2011 | Ruehl et al. |
| 8,448,096 | B1 | 5/2013 | Wang et al. |
| 8,473,874 | B1 | 6/2013 | Sharma et al. |

(Continued)

Primary Examiner — Binh C Tat
(74) Attorney, Agent, or Firm — Vista IP Law Group, LLP

(57) ABSTRACT

Various techniques implement an electronic design with hybrid analysis techniques. An activity map is identified or generated for an electronic design. The electronic design is reduced into a reduced electronic design at least by applying a plurality of reduction processes to different portions of the electronic design based in part or in whole upon the activity map. Transient behaviors of the electronic design may be determined or predicted at least by performing one or more transient analyses on a representation of the electronic design with a simulation start point based in part or in whole upon the activity map. The electronic design may then be implemented for manufacturing at least by modifying or correcting the electronic design based at least in part upon the transient behaviors.

20 Claims, 11 Drawing Sheets

(56) References Cited

U.S. PATENT DOCUMENTS

| | | |
|---|---|---|
| 8,516,404 B1 | 8/2013 | Cao et al. |
| 8,595,677 B1 | 11/2013 | Shu et al. |
| 8,645,902 B1 | 2/2014 | Yu et al. |
| 8,667,442 B1 | 3/2014 | Tian et al. |
| 8,694,943 B1 | 4/2014 | Yu et al. |
| 8,739,095 B2 | 5/2014 | Cao et al. |
| 8,807,948 B2 | 8/2014 | Luo et al. |
| 8,954,908 B1 | 2/2015 | Liu et al. |
| 8,954,917 B1 | 2/2015 | Shu et al. |
| 9,053,278 B1 * | 6/2015 | Odabasi ............... G06F 17/5072 |
| 9,064,063 B1 | 6/2015 | Yu et al. |
| 9,117,052 B1 | 8/2015 | Salowe et al. |
| 9,164,969 B1 | 10/2015 | Gumaste et al. |
| 9,286,427 B1 * | 3/2016 | Odabasi ................ G06F 17/505 |
| 9,372,955 B1 | 6/2016 | Lee et al. |
| 9,396,301 B1 | 7/2016 | Lee et al. |
| 9,652,579 B1 | 5/2017 | Arkhipov et al. |
| 9,659,138 B1 | 5/2017 | Powell et al. |
| 9,904,756 B1 | 2/2018 | Ruehl et al. |
| 10,049,175 B1 | 8/2018 | Salowe et al. |
| 10,296,695 B1 | 5/2019 | Lee et al. |
| 10,346,573 B1 | 7/2019 | Sharma et al. |
| 10,402,532 B1 | 9/2019 | Li et al. |
| 2013/0086541 A1 | 4/2013 | Luo et al. |
| 2015/0379183 A1 * | 12/2015 | Odabasi .............. G06F 17/5072 |
| | | 716/103 |

* cited by examiner

| 402B Nets | 404B Net Name / Id | 406B Net Type | 408B Idle / Active | ... |
|---|---|---|---|---|
| Net 1 | Net Name 1 | Net Type 1 | A | |
| Net 2 | Net Name 2 | Net Type 2 | I | |
| Net 3 | Net Name 3 | Net Type 3 | I | |
| ... | | | | |

METHODS, SYSTEMS, AND COMPUTER PROGRAM PRODUCTS FOR IMPLEMENTING AN ELECTRONIC DESIGN WITH HYBRID ANALYSIS TECHNIQUES

BACKGROUND

The recent advances in very deep sub-micron (VDSM) integrated circuits (ICs) have brought new challenges in the electronic design methodologies. In modern electronic circuits, the total number of transistors has increased; geometries have become smaller; and clock frequencies have increased over time. Errors on silicon have become prohibitively expensive. To address the challenges arising out of the ever increasing total number of transistors and clock frequencies, huge amount of efforts in electronic designs have been devoted to post-layout optimization and analyses that attempt to identify such errors and to fix these errors to reduce mask manufacturing errors and mask manufacturing cycle time.

Nonetheless, the number of transistors may easily exceed 100 million per square millimeter, and the total number of transistors is in the order of tens of billions in a modern integrated circuit (IC) as of the year 2017. The sheer number of transistors and hence the complexity of a modern electronic design simply requires a long runtime for any analyses to generate useful results, much less accurate result. Furthermore, parasitic effects and therefore their resulting impacts (e.g., Ohm heating, electro-migration, etc.) can no longer be ignored in the highly dense modern electronic designs. Accounting for such parasitic effects further imposes a tremendous burden on post-layout optimizers, simulators, and analyzers and hence exacerbates these challenges.

Some conventional approaches attempt to tackle such challenges by using brute force approaches in modern optimizers, simulators, and analyzers. Such conventional approaches simply require prohibitively long runtime and computational resources. Certain conventional approaches attempt to improve the computational resource utilization by applying circuit reduction techniques to reduce the size and complexity of an electronic design. Nonetheless, these conventional approaches apply a reduction technique to the entire electronic design and thus fall short due to the pessimism or optimism of the reduction technique. For example, a conservative reduction technique falls short because the limited reduction of the electronic design merely marginally improves the runtime of the post-layout optimizers, analyzers, or simulators. On the other hand, an aggressive reduction technique falls short by reducing the electronic design with an overly aggressive technique and thus fails to produce sufficiently accurate results or coverage.

Therefore, it is important for an EDA tool to more efficiently, effectively, and accurately implement electronic designs with hybrid analysis techniques described below to address at least the aforementioned shortcomings of conventional approaches.

SUMMARY

Disclosed are method(s), system(s), and article(s) of manufacture for implementing an electronic design with hybrid analysis techniques in one or more embodiments. Some embodiments are directed at a method for implementing an electronic design with hybrid analysis techniques. In these embodiments, an activity map is identified or generated for an electronic design. The electronic design is reduced into a reduced electronic design at least by applying a plurality of reduction processes to different portions of the electronic design based in part or in whole upon the activity map. Transient behaviors of the electronic design may be determined or predicted at least by performing one or more transient analyses on a representation of the electronic design with a simulation start point based in part or in whole upon the activity map. The electronic design may then be implemented for manufacturing at least by modifying or correcting the electronic design based at least in part upon the transient behaviors.

In some of these embodiments, inputs may be identified for the electronic design; and the activity map may be generated at least by performing a pre-simulation on a first representation of the electronic design. In addition or in the alternative, a plurality of circuit components in a netlist of the electronic design may be identified; and the netlist may be reduced into a reduced netlist at least by performing one or more operations on the plurality of circuit components. One or more templates may be optionally identified for representing a plurality of instances that are instantiated from one or more masters in the electronic design in some embodiments.

In addition or in the alternative, the first representation may be generated for the reduced netlist using circuit component models corresponding to the reduced netlist at least by performing an operation of the one or more operations that shorts a plurality of parasitic resistors in the netlist; a set of stimuli may be identified as inputs to the first representation; and circuit activity data may be generated at least by performing the pre-simulation on the first representation.

In some embodiments, a netlist and a set of stimuli may be identified for the electronic design; and the netlist may be reduced into a reduced netlist. In some of these embodiments, circuit activity data may be determined at least by performing the pre-simulation on the reduced netlist of the electronic design; and the activity map may be generated at least by populating at least some of the circuit activity data into a plurality of column structures of a data structure.

In some of these embodiments, a set of unique keys may be identified or determined for the data structure; the data structure may be indexed into an indexed data structure using at least the set of unique keys; and the activity map may be linked with the set of stimuli, the first representation of the electronic design, and the reduced netlist of the electronic design with one or more link structures.

To reduce the electronic design into the reduced electronic design, a plurality of reduction modules that correspond to respective frequencies may be identified; a portion of the electronic design may also be identified from a plurality of portions in the electronic design; and corresponding circuit activity data that corresponds to the portion of the electronic design may further be identified from the activity map.

In some of the preceding embodiments, a reduction module may be determined for the portion of the electronic design from the plurality of reduction modules based in part or in whole upon the corresponding circuit activity data; and the portion of the electronic design may be reduced into a reduced portion at least by executing the reduction module on the portion of the electronic design.

In addition or in the alternative, a determination may be made to determine whether respective reduction modules that respectively correspond to the plurality of portions in the electronic design have been determined; and a first analysis database may be updated using at least the reduced portion.

In some embodiments, the electronic design or the reduced electronic design may be simplified into a simplified representation of the electronic design; and a system may be generated for analyzing the electronic design by using at least the simplified representation. In some of these embodiments, steady-state behaviors of the electronic design may be determined at least by performing a steady-state analysis on the system with a set of stimuli that is used in identifying or generating the activity map; and a result set may be generated (if non-existing) or updated (if pre-existing) at least by populating at least some of the steady-state behaviors into a first data structure.

In addition or in the alternative, the simulation start point may be determined by determining or identifying a first set of unique keys for the first data structure, indexing the first data structure into a first indexed data structure using at least the first set of unique keys, and linking the first indexed data structure with the set of stimuli, the simplified representation of the electronic design with one or more link structures.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present disclosure will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 4B illustrates an example of a circuit activity map stored in an indexed data structure in some embodiments.

DETAILED DESCRIPTION

Figure 1:
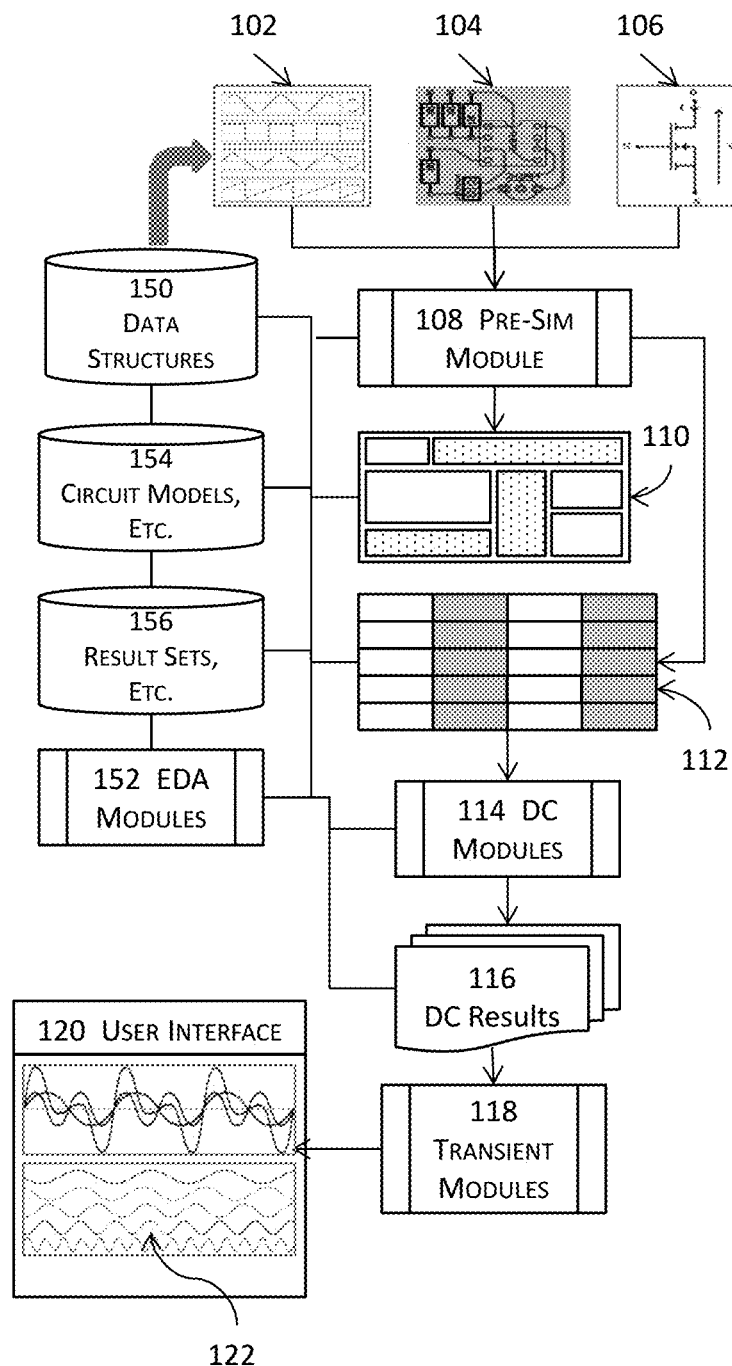
FIG. 1 illustrates a high level block diagram of a hardware system for implementing an electronic design with hybrid analyses in one or more embodiments.

Various embodiments of the invention are directed to methods, systems, and articles of manufacture for implementing an electronic design using hybrid analyses. Other objects, features, and advantages of the invention are described in the detailed description, figures, and claims.

In some embodiments, the hybrid analysis techniques described herein identify or create a circuit activity map or simply an activity map (collectively referred to as the activity map hereinafter) that corresponds to a set of stimuli for an electronic design of interest. This activity map includes information including, without limitation, information about the nets or net segments (hereinafter collectively referred to as nets for plurality or net for singular) such as the identifications of the nets, whether a net is active or idle, etc. With the activity map identified or generated for the electronic design of interest, the hybrid analysis techniques simulation apply different reduction techniques to different portions or different nets of the electronic design based at least in part upon whether these different portions or different nets are active or idle in response to the set of stimuli.

These hybrid analysis techniques determine the simulation start point that may be further imposed on a representation of the electronic design of interest (e.g., a system of equations representing the electronic design) for one or more subsequent transient analyses to capture the transient behaviors of the electronic design. The simulation start point may be determined by, for example, performing a DC (direct current) steady-state analysis to determine various nodal values (e.g., voltage values, etc.) and/or other electrical characteristics (e.g., required power supply, limits on the required power supply, branch currents, whether the devices in the electronic design are operating in a safe region without exceeding their normal ratings, etc.) at various nodes in the representation of the electronic design. During these one or more subsequent transient analyses, the activity map is again referenced in solving the representation of the electronic design by using, for example, Kirchhoff's current law. Various transient behaviors may thus be determined. For example, the one or more subsequent transient analyses may provide waveforms, various measurements, resonance condition, phase angle, Q-factor, dissipation factor, maximum and minimum impedance, charging and discharging time of capacitors and inductors, steady-state errors, etc. at various points in the electronic design of interest.

One of the advantages of these hybrid analysis techniques described herein is that unlike conventional approaches, these hybrid analysis techniques do not apply a single reduction technique or scheme to the entire electronic design or apply multiple reduction techniques or schemes to the entire electronic design at one or more stage of multiple stages. Neither do these hybrid analysis techniques apply multiple reduction techniques or schemes to multiple portions of an electronic design blindly or based on some empirical knowledge or formulae. Instead, these hybrid analysis techniques selectively apply different reduction techniques or schemes to different portions, different nets, different net segments of the same net, or different individual devices based at least in part upon the responses of these different portions, different nets, different net segments, or different individual devices to the input set of stimuli by referencing the activity map that may be constructed via a pre-simulation on the electronic design of interest with respect to the input set of stimuli. That is, these hybrid analysis techniques apply reduction techniques or schemes with lower frequencies (e.g., more aggressive reduction techniques or schemes) to portions of an electronic design that exhibit no, minimal, or reduced impact on the prediction or determination of transient behaviors and reduction techniques or schemes with higher frequencies (e.g., more conservative reduction techniques or schemes) to other portions of the electronic design that exhibit more impact on the prediction or determination of transient behaviors.

With the selective application of different reduction techniques or schemes, these hybrid analysis techniques eliminate or at least reduce the inaccuracy of conventional approaches in the determined behaviors of an electronic design due to the passivism or optimism in the application of circuit reduction techniques or schemes to the electronic design. The hybrid analysis techniques described herein thus improve the accuracy and precision of conventional approaches than, for example, those conventional approaches that apply aggressive or optimistic reduction techniques or schemes to an electronic design.

In addition, with the selective application of different reduction techniques or schemes to different portions, nets, net segments, or individual devices in an electronic design, these hybrid analysis techniques also reduce the requisite computational resource consumption (e.g., memory footprint to hold a non-reduced or less-reduced electronic design, runtime or processor cycles in processing due to a non-reduced or less-reduced electronic design, etc.) its application of more aggressive reduction techniques or schemes to the portions, nets, net segments, or individual devices that have been demonstrated as idle based at least in part on the activity map, while providing at least the same or even better accuracy in the determined transient behaviors of the electronic design than, for example, those conventional approaches that apply conservative or pessimistic reduction techniques or schemes to an electronic design.

Another advantage is that these hybrid analysis techniques further adopt a multi-stage reduction technique in conserving computational resource utilization. These hybrid analysis techniques adopt multiple stages of processes such as a pre-simulation in generating an activity map, a DC steady-state analysis in determining the simulation start point for transient analyses, and one or more transient analyses in predicting or determining the transient behaviors of an electronic design. These hybrid analysis techniques may adopt multiple stages of reduction techniques or schemes distributed among these different stages of processes.

For example, these hybrid analysis techniques may reduce the netlist of an electronic design into a reduced netlist (e.g., a capacitor-only netlist) during the determination of the activity map in the pre-simulation; and these hybrid analysis techniques may selectively apply circuit reduction techniques or schemes to the electronic design based in part or in whole upon the activity map during the determination of the simulation start point and during the subsequent transient analyses. In addition, these hybrid analysis techniques may adopt circuit component models having different levels of details during the determination of the simulation start point and/or the subsequent transient analyses also based in part or in whole upon the activity map. For example, these hybrid analysis techniques may use a simplified or reduced transistor model for a transistor that is shown to be idle at some point in time according to the activity map, while using a more detailed transistor model for another transistor that is shown to be active in the activity map. These hybrid analysis techniques may further skip one or more partitions in the electronic design when these one or more partitions are shown to be idle at a point in time in the activity map. Therefore, these hybrid analysis techniques adopt a multi-stage reduction scheme to achieve a balance between the desired accuracy and computational resource utilization or to achieve the same accuracy in the predicted or determined transient behaviors with reduced computational resource utilization.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

FIG. 1 illustrates a high level block diagram of a hardware system for implementing an electronic design with hybrid analyses in one or more embodiments. More specifically, FIG. 1 illustrates a pre-simulation module 108 that performs a simulation with inputs such as the input stimuli 102, the netlist (e.g., a post-layout netlist) or a reduced version of the netlist of an electronic design of interest 104, and a plurality of circuit component models 106 (e.g., MOSFET models, transistor models, etc.) having one or more levels of details for each circuit component model.

The pre-simulation module 108 performs the simulation to generate output data, at least some of which may be populated into an indexed data structure 112 which is also referenced as an activity map of the electronic design of interest in response to the input stimuli (102). The indexed data structure 112 may be stored persistently together with one or more data structures (e.g., database tables such as the design database tables, one or more simulation databases, etc.) 150 in a persistent storage device.

The plurality of circuit component models 106 may be retrieved from a set of circuit component models 154 (e.g., s-parameter models, SPICE models, transmission line models, plane and medium models including plane and medium parameters, any combinations thereof, or any other models that may be used to represent a device in an electronic design) that is persistently stored on a storage device 154.

An activity map may be of a tabular form 112 (e.g., an indexed database table) and/or a graphical form that graphically illustrates which portions, nets, net segments, and/or individual devices are active, and which are idle with graphical and/or textual emphasis in a user interface to provide visual cue to aid users or designers. The graphical form of an activity map may also be customized by a user to select, for example, active portions, nets, net segments, or individual devices (collectively "portions" for plural or "portion" for singular) in a user selected region, device, or cell of an electronic design while suppressing the circuit activity information of the other non-selected regions, devices, or cells to avoid cluttering the user interface and to facilitate the ease of implementing the electronic design. The graphical form (110) and the indexed tabular form (112) of the activity map may be linked with a link structure (e.g., a set of pointers, symbolic links, etc.) so that users or various modules may cross-reference between these two forms of the activity map to facilitate the identification of and access to the data therein. Newly generated activity maps 112 may also be persistently stored together with the result sets 156 of analysis results on a persistent storage device or temporarily stored in, for example, the random access memory of a computing system.

One or more circuit reduction modules in the set of EDA (electronic design automation) modules 152 may select different reduction techniques to different portions of the electronic design based in part or in whole upon the activity map. For example, a lower frequency reduction technique may be selected for a region, a net, or a net segment that is shown to be idle in the activity map; and a higher frequency reduction technique may be selected for another region, another net, or another net segment that is shown to be active in the activity map. In addition or in the alternative, more simplified circuit component models may be loaded for portions, nets, or net segments that are shown to be idle in the activity map; whereas more complex circuit component models may be loaded for other portions, nets, or net segments that are shown to be active in the activity map.

One or more DC analysis modules 114 may perform a DC steady-state analysis on a representation of the electronic design with the full netlist in some embodiments or on another representation of the electronic design with a reduced netlist. These one or more DC analysis modules 114 perform the DC steady-state analysis to generate results 116, at least a part of which may be used as the simulation start point for the one or more transient modules 118. In some embodiments, the results generated by the pre-simulation module 108 may also be used or referenced in the simulation start point for the one or more transient modules 118. The one or more transient modules 118 may perform one or more transient analyses on a representation of the electronic design based in part or in whole upon the activity map (110 or 112) by using the same set of input stimuli (102) that is also used as input for the pre-simulation module 108 in generating the activity map.

The one or more computing systems having the aforementioned modules (e.g., 108, 114, 118, etc.) may further include or function in conjunction with the EDA modules 152. This set of EDA modules 152 may include, for example, a schematic editor, a floorplanner, a global routing engine, and/or a detail routing engine, a layout editor, a design rule checker, a verification engine, post-layout optimizers (e.g., OPC or optical proximity correction modules, phase shift mask or PSM tools, resolution enhancement technology or RET tools, computational lithography tools, etc.)

The set of resources or modules 152 include more tools that function in conjunction with the aforementioned modules or resources. For example, the set of EDA modules 152 may comprise one or more electrical analysis modules to perform various analyses (e.g., electrical analyses, static and/or transient thermal analyses, etc.) on a model of an electronic design of interest. The set of EDA modules 152 may further optionally include one or more physical optimization and correction modules, signoff modules, and design closure modules (not shown) to perform various optimization, correction, signoff, and design closure tasks to ensure that the electronic design implemented by various techniques described herein may be successfully fabricated while maintaining various performance, cost, reliability, and manufacturability requirements.

For example, the one or more signoff modules may include one or more timing signoff modules to perform timing analyses and timing closure related tasks (e.g., silicon-accurate timing signoff, signal integrity analyses, etc.) to ensure an electronic design meets power, performance, or other requirements before tapeout, one or more signoff parasitic extraction modules to provide silicon-accurate interconnect parasitic extraction and ensure first-pass silicon success, and one or more power signoff modules to perform various power integrity analyses, transistor-level electromigration analyses, IR-drop analyses, other power and signal integrity analyses to ensure an electronic design meets or exceeds power, performance, and/or area goals in some embodiments.

The one or more signoff modules may include one or more physical verification modules (not shown) to perform various design rule checking, layout vs. schematic (LVS), etc. tasks to ensure that an electronic design meets or exceeds various spatial and other physical rules and one or more design for manufacturing (DFM) modules to address physical signoff and electrical variability optimization, correct lithography hotspots, predict silicon contours, improve yield, detect and repair timing and leakage hotspots to achieve variation- and manufacturing-aware signoff and design closure in some of these embodiments.

In addition or in the alternative, the one or more signoff modules may include one or more one or more computational lithography modules (not shown) to provide more accurate post-etch critical dimension accuracy and process windows on silicon, reticle and wafer synthesis, etc. to eliminate mask-manufacturing errors and/or reduce mask-manufacturing cycle times. One or more of these multi-fabric signoff modules may operate on the electronic design produced or modified with various techniques to be described in the following sections for proper signoff and design closure so that the signoff version of the electronic design may be properly manufactured with first-pass or fewer passes silicon success in some embodiments. In these embodiments, the signoff version of the electronic design produced or modified with various techniques described herein causes the underlying electronic circuit to be manufactured by a foundry or IC (integrated circuit) fabrication facility when the signoff version of the electronic design is forwarded to the foundry or IC fabrication facility that in turn fabricates the requisite photomasks and the eventual electronic circuit.

These EDA modules 152 may also include or at least function in conjunction with one or more microprocessors via a computer bus in some embodiments. In these embodiments, a single microprocessor may be included in and thus shared among more than one module even when the computing system includes only one microprocessor. A microprocessor may further access some non-transitory memory (e.g., random access memory or RAM) via a system bus to read and/or write data during the microprocessor's execution of processes.

Figure 2A:
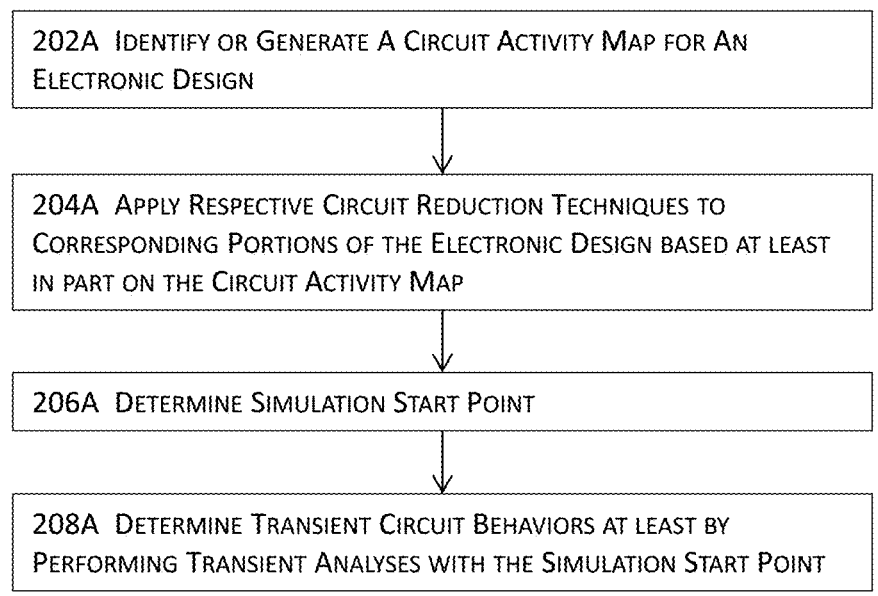
FIG. 2A illustrates a high level block diagram for implementing an electronic design with hybrid analyses in some embodiments.

FIG. 2A illustrates a high level block diagram for implementing an electronic design with hybrid analyses in some embodiments. In these embodiments, these hybrid analysis techniques may identify (if existing) or generate (if non-existing) an activity map for an electronic design of interest at 202A. In some of these embodiments where the activity map does not exist, these hybrid analysis techniques may generate the activity map by performing a pre-simulation. These hybrid analysis techniques may first optionally reduce the netlist (e.g., a post-layout netlist) into a reduced netlist with various circuit reduction techniques. For example, these hybrid analysis techniques may short all the parasitic resistances while keeping the parasitic capacitances in the reduced representation of the electronic design.

A simulation may be performed on the reduced representation of the electronic design with a set of stimuli imposed on the reduced representation. In some other embodiments, the simulation may be performed on the representation of the electronic design with a full netlist including all the parasitics. It shall be noted that although one of the purposes of performing the simulation on such a system of a reduced netlist (or a full netlist with all parasitics) is to generate the activity map for the underlying electronic design, and hence the simulation may be referenced as a pre-simulation to distinguish from subsequent simulation(s), the results of this pre-simulation nevertheless provide fairly accurate behaviors of the underlying electronic design.

Therefore, to the extent that the representation in the pre-simulation covers at least a portion of the electronic design, the pre-simulation results may also be referenced or utilized as the simulation start point for subsequent transient analyses in some embodiments. In these embodiments, these hybrid analysis techniques may skip the portions of the electronic design that are covered by the representation of the electronic design for pre-simulation in another analysis (e.g., the analysis performed at 206A) that determines the simulation start point to further conserve computational resource utilization. In addition or in the alternative, the pre-simulation results may be used as the start point of the simulation (e.g., a DC steady-state analysis) that is performed to determine the simulation start point of one or more subsequent transient analyses in some embodiments.

The results of the pre-simulation may be populated to an indexed data structure—the activity map. The activity map may include various information or data about the underlying electronic design. For example, the types of nets, the identifications of nets, the state of the nets (e.g., active, idle, etc.), the stimuli, etc. The data structure may further be indexed with, for example, a set of unique keys to facilitate the subsequent look-up of information from the activity map. For example, the net identifications may be used to index the activity map when the net identifications are unique. In some embodiments where the net identifications may not necessarily be unique (e.g., the same net in different instances of cells may use the same net identification), the unique keys may be constructed with the net identification together with other information such as the hierarchy information, the parent cell information, etc. to convert the net identifications into unique net identifications.

In some embodiments, an activity map may be specific to an electronic design and a set of stimuli provided to the electronic design because whether a circuit device is idle or active at a point in time depends on the operations of the electronic design in response to the provided stimuli. This set of stimuli used in generating the activity map will thus be reused later in subsequent analyses to maintain consistency and ensure applicability in these embodiments.

With the activity map identified or determined at 202A, these hybrid analysis techniques may apply respective circuit reduction techniques or schemes having corresponding frequencies to corresponding portions of the electronic design based at least in part upon the activity map at 204A. For example, a more aggressive reduction technique or scheme having a lower frequency may be applied to portions, nets, or net segments that, according to the activity map, remain idle at certain points in time in response to the input stimuli. For these portions, nets, or net segments, aggressive reduction will not affect or at least will not significantly affect the accuracy of the behaviors of the electronic design in subsequent analyses because these portions, nets, or net segments remain idle at these certain points in time.

On the other hand, a higher frequency reduction technique or scheme may be applied to portions of the electronic design that are active at these points in time because these portions are active at these certain points in time and reduction in the details of these portions may reduce the granularity and/or accuracy in the predicted behaviors of these portions or even the entire electronic design in subsequent analyses. In some of these latter embodiments, no reduction will be applied to certain circuit portions, nets, or net segments when one or more criteria are met. For example, no reduction may be applied to a critical portion or a portion whose performance has a higher priority over the other criteria.

Simulation start point may be determined at 206A for one or more subsequent transient analyses that are performed to determine or predict the behaviors of the underlying electronic design in response to the input stimuli. For example, these hybrid analysis techniques may perform a DC (direct current) steady-state analysis on the electronic design to check the BIAS conditions in order to determine, for example, voltage values at various nodes in the electronic design, required power supply, limits on the power supply, current consumption, and/or whether circuit devices are operation in the safe region without exceeding their normal ratings, etc.

With the simulation start point determined, the transient circuit behaviors may be determined at 208A at least by performing one or more transient analyses with the simulation start point. The transient circuit behaviors so determined or predicted may be stored in a result set database table that may be further linked to the representation of the electronic design so that a user may quickly query the result set database to obtain the desired behaviors at various points in the electronic design by probing these points. These transient circuit behaviors may include, for example, the charging time and discharging time of capacitors and inductors, resonance conditions, phase angle, Q-factor, dissipation factor, maximum and minimum impedance, and/or signal waveforms, etc.

When the transient behaviors exhibit issues with the underlying electronic design, the underlying electronic design may be modified to correct or avoid or at least reduce the impact of these issues in order to eliminate or reduce photomask manufacturing cycle times and/or to reduce or eliminate errors on silicon.

Figure 2B:
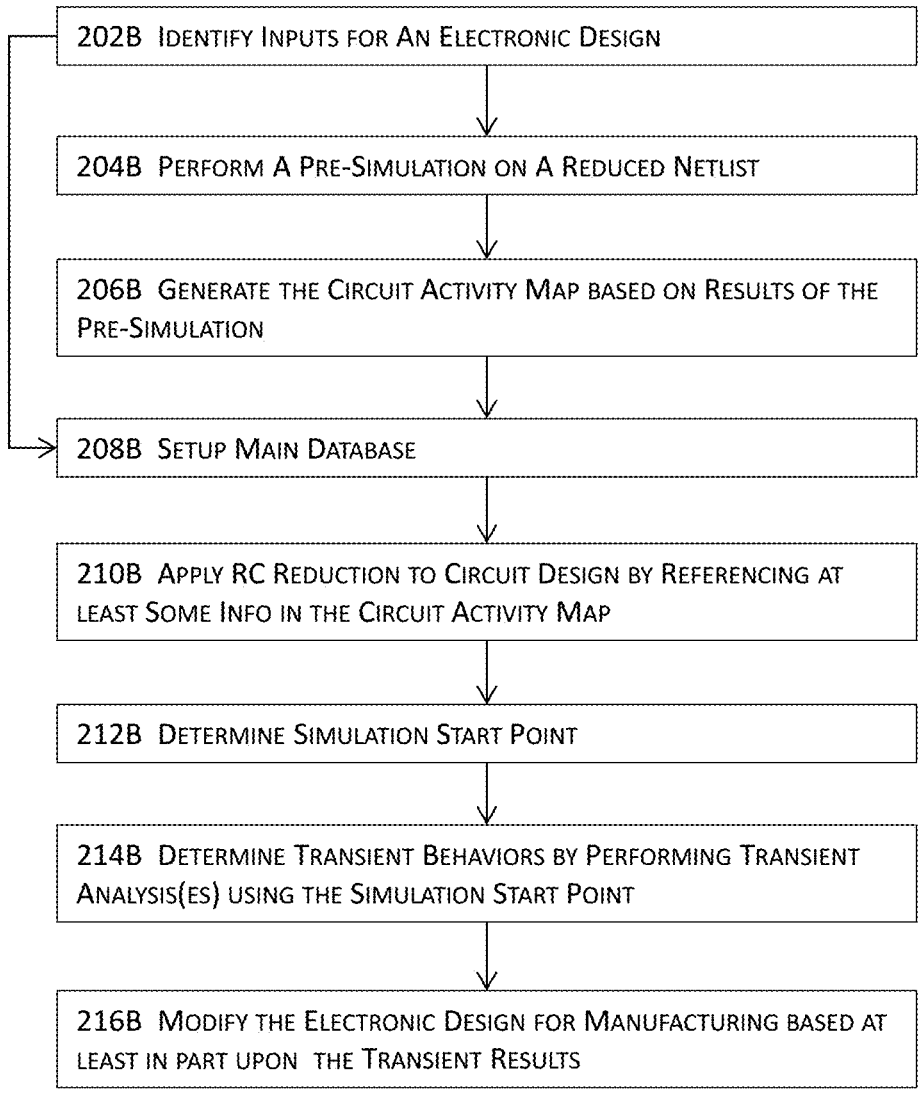
FIG. 2B illustrates a more detailed block diagram for implementing an electronic design with hybrid analyses in some embodiments.

FIG. 2B illustrates a more detailed block diagram for implementing an electronic design with hybrid analyses in some embodiments. In these embodiments, the hybrid analysis techniques may identify inputs at 202B for analyzing an electronic design. Some examples of inputs may include, without limitation, a set of stimuli (e.g., time-dependent input signals), the netlist (e.g., a post-layout netlist), parasitics (e.g., parasitic resistance, capacitance, and/or inductance), circuit component models (e.g., s-parameter models, SPICE models, transmission line models, plane and medium models including plane and medium parameters, any combinations thereof, or any other models that may be used to represent a device in an electronic design), etc. Among these inputs, the set of stimuli may be referenced in multiple analyses such as the pre-simulation to determine the activity map, the DC steady-state to determine the simulation start point, and the transient analysis to determine the transient behaviors of the underlying electronic design in some embodiments.

A pre-simulation may be performed at 204B to generate pre-simulation results. In some embodiments, the pre-simulation may be performed on a representation of the underlying electronic design with the full netlist and full parasitic effects (e.g., parasitic resistances, capacitances, and inductances). In some other embodiments, a reduced representation may be generated by, for example, preserving only the parasitic capacitance while shorting the parasitic resistances. Yet in other embodiments, other suitable circuit reduction techniques may also be applied to the electronic design, the netlist, or the portion thereof to reduce the size, complexity, and/or level of details or granularity of the electronic design for generating the activity map with the pre-simulation. The analysis performed at 204B may be referred to as a pre-simulation because this analysis is performed before the subsequent transient analyses that predict or determine the transient behaviors of the electronic design or a portion thereof.

The simulation results of the analysis performed at 204B may be used to construct the activity map of the underlying electronic design in response to the input stimuli at 206B. An activity map may be generated in a tabular form such as an indexed data structure and/or in a graphical form that provides circuit activity data of the underlying electronic design or a portion thereof (e.g., a net, a net segment, a device along a net segment, a terminal or pad of a device, etc.) in a user-customizable graphical representation of the electronic design with graphical and/or textual emphasis. A user may, for example, select active net(s), net segment(s), device(s), terminal(s), etc. of the entire electronic design, a portion of the electronic design at a hierarchical level or granularity level, or a portion of the electronic design (e.g., a block, a cell, a region, etc.), while various modules send instructions to the graphics processing unit (GPU) to suppress the other non-selected portions of the electronic design.

The graphical form and the tabular form of an activity map may be cross-linked by using, for example, pointers, link structures, symbolic links, etc.; and both may further be linked to the electronic design database (e.g., a layout database, a schematic database, etc.) so as to allow a user to quick locate and visualize a specific circuit component across various representations of the same electronic design at different abstraction levels with overlaid or separately displayed analysis results. It shall be noted that 204B and 206B are performed when the activity map for an electronic design of interest does not exist and thus needs to be generated anew.

With the activity map identified or generated, the main database for subsequent simulations may be set up at 208B by, for example, loading the netlist and/or the circuit component models into the memory of a computing system. In some embodiments where the electronic design is hierarchical having multiple hierarchies (e.g., a hierarchical layout database), this hierarchical electronic design may be flattened by promoting all circuit components together with the corresponding interconnections to the highest hierarchy.

Different simulations may correspond to different databases. For example, these hybrid analysis techniques may populate a pre-simulation database with the circuit components in an entire netlist with full parasitics or with reduced parasitics. In some embodiments, a pre-simulation database is populated with the information about circuit component designs in the netlist and parasitic capacitances, while shorting all the parasitic resistances. As another example, a DC steady-state analysis database may be populated with the information about the circuit component designs while all capacitances are replaced with or treated as (without replacement) open circuits, and all inductances are shorted because DC steady-state analyses consider the steady-state circuit behavior and do not account for the transient behaviors (e.g., charging, discharging, etc.) of circuit components such as the capacitors and inductors. As another example, a transient analysis database may be populated with the most complete information about the circuit component designs with models that represent both the static and the transient behaviors of circuit components.

As briefly described above, these hybrid analysis techniques employ multiple stages of analyses. For example, a simulation may be performed on an electronic design with reduced parasitics to generate an activity map for the underlying electronic design in response to input stimuli. In some embodiments, the results of this analysis may also be used as the simulation start point of the eventual transient analyses. In some other embodiments, a DC steady-state analysis may be optionally performed to provide the simulation start point. For example, the electronic design in the pre-simulation may include reduced parasitics (e.g., by shorting all parasitic resistances).

Although the results of the pre-simulation are sufficiently accurate to serve as the simulation start point, the representation of the electronic design is nevertheless reduced and does not provide sufficient coverage for some circuit components and/or effects (e.g., parasitic effects) in some embodiments. In these embodiments, the pre-simulation results do not provide the simulation start point for such circuit components and/or effects, and a separate DC analysis may be performed without reducing the parasitic effects to provide the simulation start point. In some embodiments, these hybrid analysis techniques consider and predict the costs of the pre-simulation and the DC analysis and intelligently determine whether only a pre-simulation is to be performed, whether both a pre-simulation and the DC analysis are to be performed, or only a DC simulation is to be performed.

In some embodiments where a DC analysis is to be performed, the electronic design may be subject to further reduction at 201B into a reduced electronic design based in part or in whole upon the activity map. These hybrid analysis techniques may apply different reduction techniques having different frequencies to different portions, nets, net segments, or individual devices based at least in part upon whether these portions, nets, net segments, or individual devices are active or idle as shown in the activity map. For example, one or more hybrid analysis modules (e.g., 108, 114, 118, and/or 152) may look up the activity status of these portions, nets, net segments, and/or individual devices and apply more aggressive reduction techniques having lower frequencies to idle circuit components and more conservative reduction techniques (or even no reduction) having higher frequencies to active circuit components and/or critical circuit components.

The simulation start point for subsequent transient analyses may be determined at 212B. As described above, the simulation start point may be determined by performing a DC simulation on the reduced electronic design obtained at 210B in some embodiments or from the pre-simulation results in some other embodiments. In some embodiments, a DC analysis module references the pre-simulation results, extracts useful results therefrom, and converts these useful results as the simulation start point for at least a portion of the electronic design covered by the pre-simulation results. The DC analysis module may then skip this portion of the electronic design by, for example, treating the results obtained from the pre-simulation as known or boundary conditions to further conserve computational resource utilization.

With the simulation start point, the transient behaviors of the electronic design may be determined at 214B by performing one or more transient analyses with the input stimuli that are also used in the pre-simulation and the simulation start point. Various transient behaviors may be determined at this stage. For example, the charging time and discharging time of capacitors and inductors, resonance conditions, phase angle, Q-factor, dissipation factor, maximum and minimum impedance, and/or signal waveforms, etc. may be determined at 214B. When the transient behaviors exhibit issues with the underlying electronic design, the underlying electronic design may be modified at 216B to correct or avoid or at least reduce the impact of these issues in order to eliminate or reduce photomask manufacturing cycle times and/or to reduce or eliminate errors on silicon.

Figure 3A:
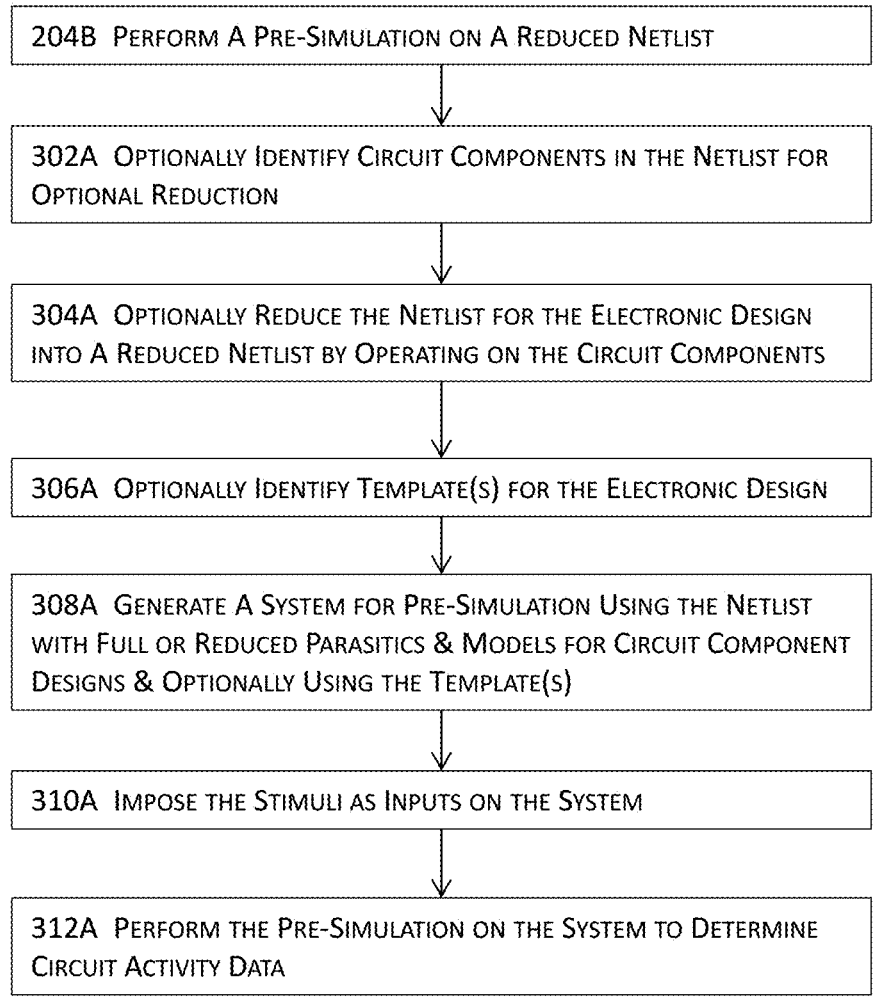
FIGS. 3A-3E respectively illustrate more detailed block diagrams for the block diagram for implementing an electronic design with hybrid analysis techniques illustrated in FIG. 2B in some embodiments.

FIGS. 3A-3E respectively illustrate more detailed block diagrams for the block diagram for implementing an electronic design with physical simulation using layout artwork illustrated in FIG. 2B in some embodiments. FIG. 3A illustrates more details about performing a pre-simulation (204B) of FIG. 2B. In these embodiments, one or more circuit components may be optionally identified at 302A. These one or more identified circuit components may be designated as the target for optional reduction. One or more reduction operations may be performed at 304A on these one or more identified circuit components. For example, a plurality of circuit components may be lumped and represented as a lumped model. In some embodiments, all the parasitic resistances and/or the parasitic inductances that exhibit parasitic resistance effects are shorted at 304A by these one or more reduction operations that leave only the parasitic capacitances in the reduced representation of the underlying electronic design.

In some embodiments, one or more templates may be optionally identified at 306A for the underlying electronic design. A template may comprise a sub-circuit model that represents a group of circuit component designs that is repeatedly instantiated as a plurality of instances in the electronic design. For example, the memory cells in an SRAM (static random access memory) may be largely (e.g., as in a limited number of master cells) or entirely identical in the SRAM. In this example, these memory cells may thus be represented as one or more templates or sub-circuits to simplify the modeling, processing, and computation for these memory cells.

A system may be generated at 308A by using the netlist with full or reduced parasitics as well as circuit component models to represent the electronic design upon which the pre-simulation is to be performed. Input stimuli may be imposed at 310A on the system generated at 308A to provide inputs for the pre-simulation. The pre-simulation may then be performed on the system at 312A to determine circuit activity data.

One of the purposes of a pre-simulation is to determine whether a portion, a net, a net segment, or an individual device is active or idle at a certain point in time. This information is populated into the activity map for the electronic design. Various techniques may be employed to determine whether a circuit component is active or idle. For example, a nodal voltage value or a change thereof may be compared with a user-configurable threshold value (e.g., 100 mV). That is, when a nodal voltage value or a change thereof is greater than or equal to (or simply greater than) the threshold value, the corresponding node is determined to be active. On the other hand, when a nodal voltage value or a change thereof is determined to be smaller than or equal to (or simply smaller than) the threshold value, the corresponding node and hence the circuit component is determined to be idle. As mentioned above, the threshold value may be configurable by a user based in part or in whole upon, for example, the types, criticality, performance requirement, etc. of the circuit component. Furthermore, multiple threshold values may be used for different circuit component types in the same electronic design.

The pre-simulation results may or may not be stored. In some embodiments where the purpose of the pre-simulation is to generate the activity map, the irrelevant portions (e.g., nodal values, branch currents, etc.) of the pre-simulation results that are irrelevant to indicate the active or idle state may be discarded to save memory footprint. In some other embodiments where the pre-simulation results may be further referenced or used to determine the simulation start point, even these irrelevant portions of the pre-simulation may be preserved, at least in a temporary storage (e.g., in memory) or even persistently in a storage device.

Figure 3B:
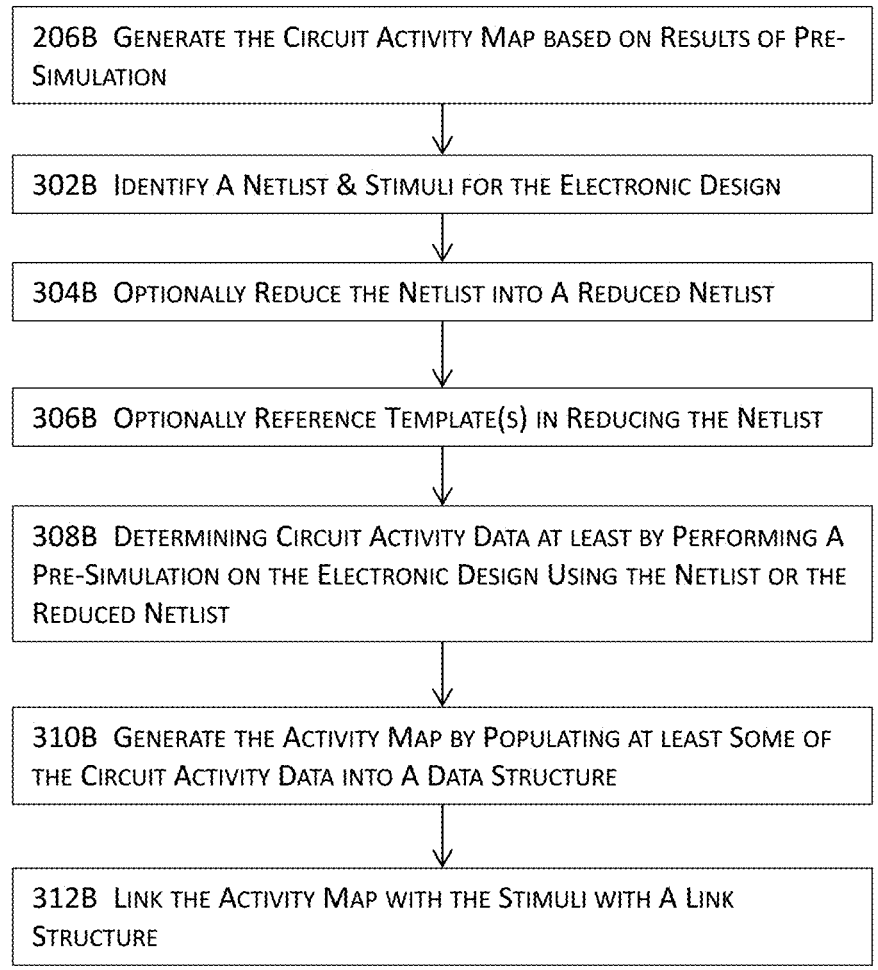

FIG. 3B illustrates more details about generating a circuit activity map (206B) of FIG. 2B. In these embodiments, a hybrid analysis module (e.g., 108 of FIG. 1) may identify a plurality of inputs for the electronic design at 302B. These inputs may include, for example, a netlist (e.g., a post-layout netlist), parasitics (e.g., parasitic resistances, capacitances, and/or inductances), circuit component models representing various circuit components having one or more levels of details for each circuit component model, input stimuli (e.g., a set of input signals, values, or states), etc. for the electronic design.

The netlist may be optionally reduced into a reduced netlist at 304B. For example, a hybrid analysis module (e.g., a parasitic simplification module that may be a part of or may be functioning in conjunction with the pre-simulation module 108) may short all the parasitic resistances (and/or the parasitic inductances exhibiting parasitic resistance effects) to reduce the netlist into the reduced netlist. In some embodiments, a portion of the electronic design may be reduced by aggregating the portion of the electronic design into a lumped, simplified representation to reduce the complexity or the level of details of the portion.

Modern post-layout electronic designs include primarily RC nets and transistors. With the parasitic resistances, a modern post-layout electronic design may include billions of resistors which may affect the electrical characteristics (e.g., power consumption, Ohm heating, etc.) of the electronic design but may not necessarily affect the active or idle state of the underlying electronic design. Shorting such parasitic resistors may thus change the electrical behaviors (e.g., branch current, nodal voltage values, etc.) of the electronic design but may not be sufficient to alter the active state and idle state of circuit components and thus provide a sufficiently accurate prediction for the active and idle states of various portions, nets, net segments, and individual devices in the electronic design for the purpose of generating an activity map, while significantly reducing the size of the electronic design and thus the matrix for subsequent pre-simulation.

In some embodiments where the electronic design may include multiple instances of one or more master cells, the corresponding templates may be optionally identified and referenced at 306B to simplify the representation of the electronic design to the pre-simulation module. The pre-simulation module (108) may then perform a simulation on the representation (e.g., the reduced netlist, the representation having one or more templates, etc.) of the electronic design at 308B to predict or determine circuit activity data. This circuit activity data comprises information indicative of the active or idle states of various portions, nets, net segments, and/or individual devices in the electronic design. This circuit activity data may then be referenced, and at least a part of the circuit activity data may be populated into the activity map at 310B. This activity map may further be linked to or associated with various other pieces of data or information such as the input stimuli, the electronic design at one or more abstraction levels, and/or various analysis results at 312B.

Figure 3C:
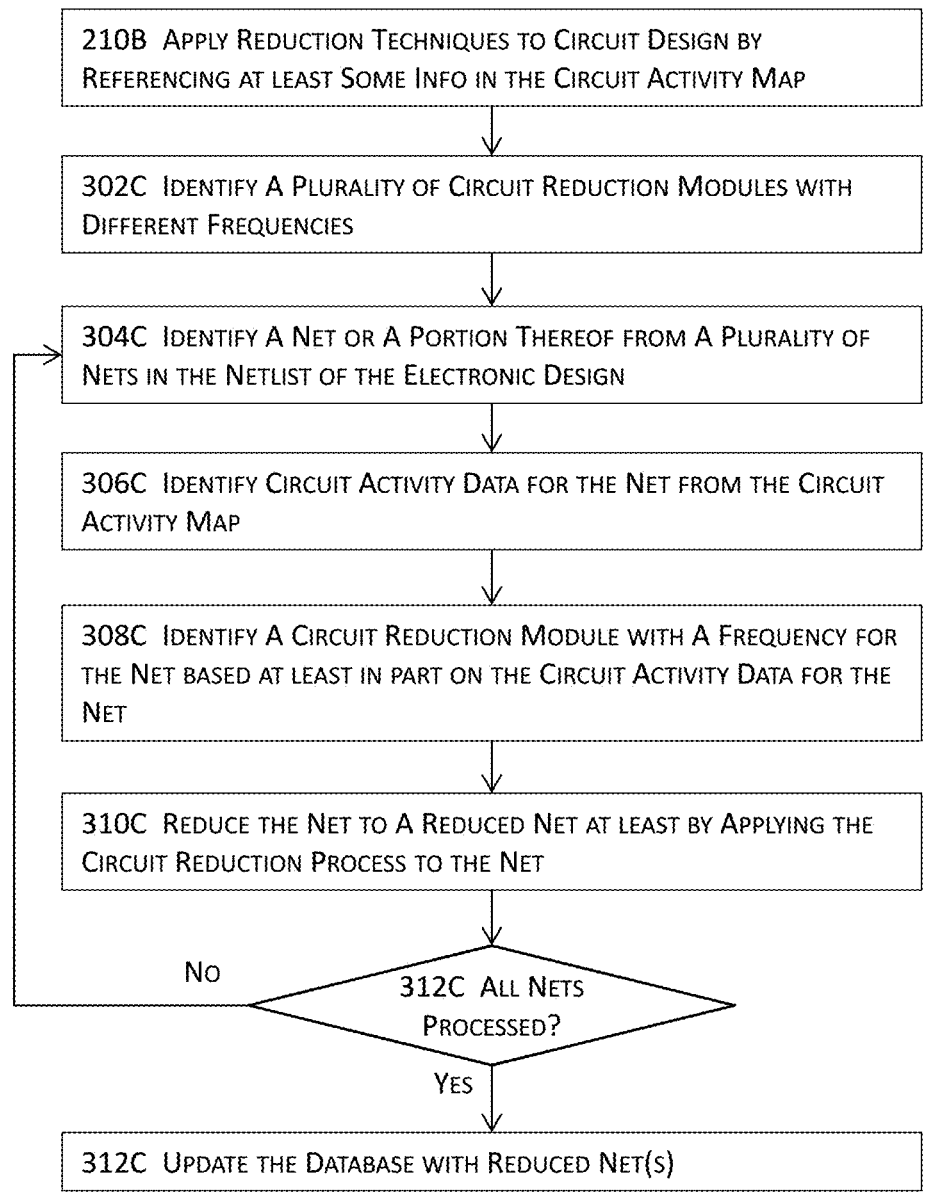

FIG. 3C illustrates more details about applying reduction techniques (210B) of FIG. 2B. In these embodiments, a plurality of reduction techniques and their corresponding modules may be identified at 302C. Each of the plurality of reduction techniques corresponds to a different frequency where a lower frequency indicates a more aggressive reduction technique, and a higher frequency corresponds to a more conservative reduction technique. A net, a net segment, or an individual device may be identified at 304C from a plurality of nets, net segment, or individual devices in the electronic design.

The corresponding circuit activity data may be identified at 306C for the identified net, net segment, or individual device. For example, the indexed data structure representing the activity map may be queried with a database query using the unique key that corresponds to the identified net, net segment, or individual device. By indexing the activity map with such unique keys, the entries in an activity map may then be sorted in a certain order (e.g., in an alphabetical order as represented by the unique keys). Moreover, the corresponding circuit activity data in the indexed data structure can be more efficiently and quickly located by referencing the unique key in a database query, without traversing through the entire activity map to find the corresponding circuit activity data.

With the circuit activity data identified at 306C, a reduction module (which may be a part of the EDA modules 152 in FIG. 1) may select a reduction technique at 308C based at least in part upon the identified circuit activity data. For example, the reduction module may identify a more aggressive reduction technique (or the most aggressive reduction technique corresponding to the lowest frequency) for an idle portion, net, net segment, or individual device. As another example, the reduction module may identify a more conservative reduction technique (or the most conservative reduction technique having the higher frequency or even no reduction at all) for an active portion, net, net segment, or individual device so that the portion, net, net segment, or individual device is represented with more design details to capture its behaviors with finer granularity or resolution in subsequent simulation(s).

The reduction module may then apply the identified reduction technique to the corresponding portion, net, net segment, or individual device at 310C to reduce the netlist into a reduced netlist. In some embodiments where a plurality of circuit models with different complexities or design details have been generated for a circuit component design, the corresponding circuit models may be identified at 310C to represent the circuit component design, based in part or in whole upon the circuit activity data in the activity map. The reduction module may then determine whether all the portions, nets, net segments, or individual devices in the electronic design have been processed at 312C. If the determination is affirmative, the database (e.g., the simulation database for the DC analysis and/or the transient analysis) may be updated at 312C. Otherwise, the process returns to 304C to identify the next portion, net, net segment, or individual device and repeats 304C through 312C until all the portions, nets, net segments, or individual devices have been similarly processed.

In some embodiments where the electronic design includes multiple instances of the same master, these multiple instances may be further linked or associated with each other and the master so that the reduction module may apply the selected reduction technique once, and all these multiple instances will be represented accordingly in the reduced netlist, if these multiple instances correspond to the same active or idle state.

Figure 3D:
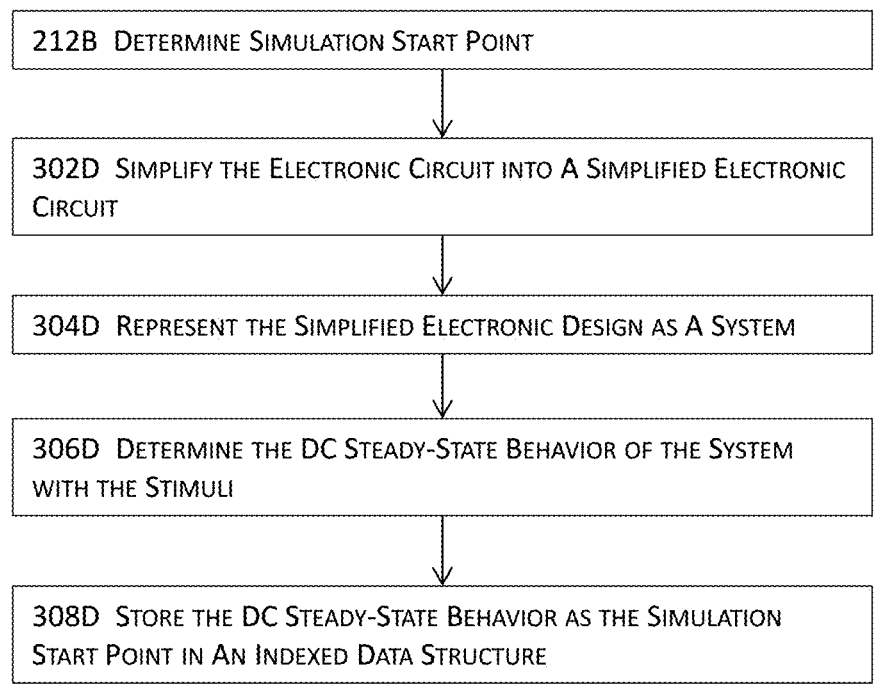

FIG. 3D illustrates more details about determining the simulation start point (212B) of FIG. 2B. In these embodiments, the electronic design may be optionally simplified into a simplified electronic design at 302D based at least in part upon the analysis that is to be performed on the electronic design to determine the simulation start point. During a transient period, a capacitor builds up charge and eventually stops the flow of current and thus acts like an infinite resistor (open circuit). An inductor, on the other hand, builds up energy in the form of a magnetic field during the transient period and thus become conductive afterwards. In an example where a DC steady-state analysis is to be performed to determine the simulation start point, all the capacitors may be replaced with or treated as (without replacement) open circuits, and all the inductors may be replaced with or treated as (without replacement) short circuits (with or without the corresponding resistances) in the electronic design because a DC steady-state analysis does not consider the transient behavior of the capacitors and inductors. In this example, the electronic design is thus simplified into a simplified electronic design having resistors and voltage sources.

The electronic design or the simplified electronic design may be represented as a system (e.g., a finite-state machine or a system of equations under, for example, the Ohm's Law for a DC analysis) at 304D for the upcoming analysis to be performed to determine the simulation start point. An analysis (e.g., a DC steady-state analysis) may be performed at 306D to determine the behaviors of the system. These behaviors may be identified as the simulation start point and stored in a result set at 308D.

The result set may be stored in an indexed data structure that includes, for example, the same unique keys for the nets, net segments, or individual devices as those in the activity map with the additions of, for example, node identifications of a plurality of nodes and the corresponding values for the plurality of nodes. In some embodiments, the data in the result set may be stored in the indexed data structure of the activity map by augmenting the indexed data structure of the activity map to accommodate the nodes and their respective values (e.g., by adding one or more rows for one or more nodes of a net, a net segment, or a device in the indexed data structure of the activity map). In some other embodiments, the result set may be stored in a separate, indexed data structure that may be further associated with or linked to the indexed data structure of the activity map so that the activity map and the result set may be cross-referenced with improved efficiency and expediency.

Figure 3E:
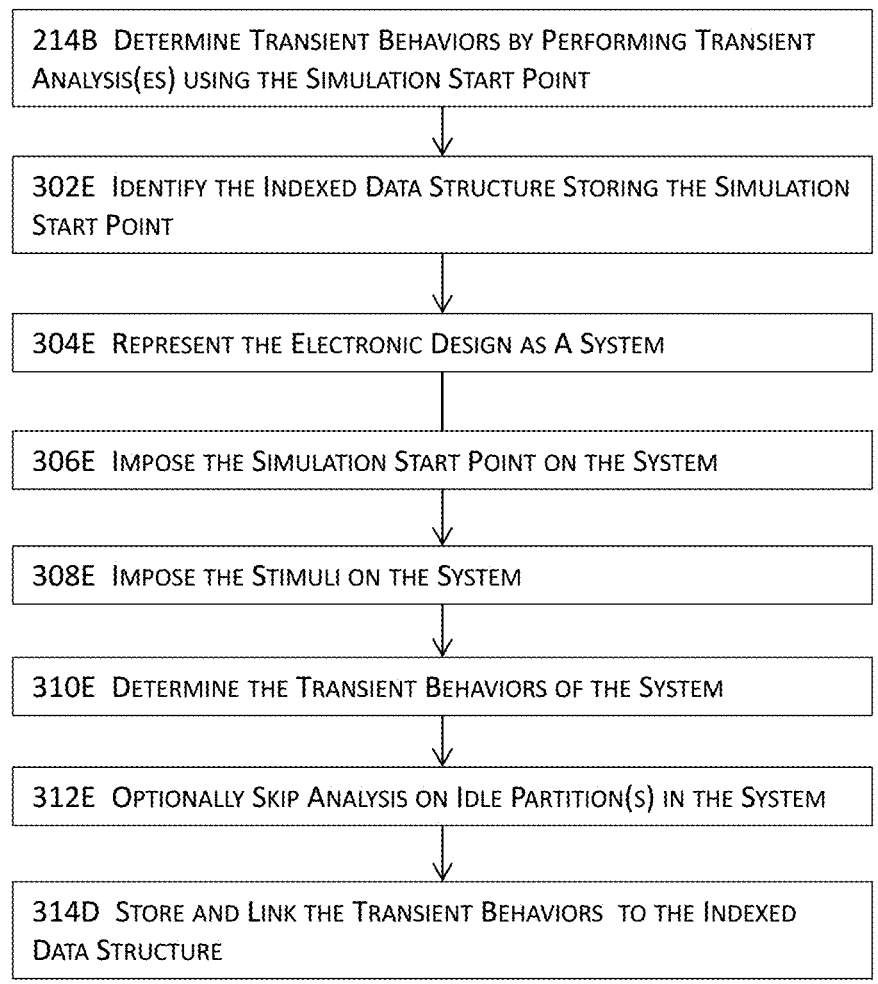

FIG. 3E illustrates more details about determining transient behaviors (214B) in FIG. 2B. In these embodiments, the indexed data structure storing the simulation start point may be identified at 302E. The electronic design may be represented as a system at 304E. For example, an electronic design may be represented as a system of equations using the Kirchhoff's voltage law that comprises a set of differential equations for RLC circuits. The simulation start point may be imposed on the system for the electronic design at 306E by, for example, assigning nodal or branch values to the corresponding portions of the electronic design and hence the system of the electronic design. In addition, input stimuli may also be imposed on the corresponding portions of the electronic design and hence the system of the electronic design at 308E.

Transient behaviors of the electronic design may be predicted or determined at 310E by performing one or more transient analyses or simulations on the system with the input stimuli and the simulation start point. A transient analysis module may determine the transient behaviors in the time domain in some embodiments. For example, depending on the damping factor and the pole frequency, a circuit or a sub-circuit may be determined to be over-damped, critically-damped, or under-damped, and the corresponding governing equation may be identified to determine the behaviors accordingly. The transient behaviors may be determined in the frequency domain as well at least by first determining the transfer function in the s-domain, by applying a time-dependent step waveform to the electronic circuit or a portion thereof, and by calculating the response of the electronic design or the portion thereof by the convolution of the impulse response and the time-dependent step waveform.

The transient behaviors thus predicted or determined may include, for example, waveforms, various measurements, resonance condition, phase angle, Q-factor, dissipation factor, maximum and minimum impedance, charging and discharging time of capacitors and inductors, steady-state errors, etc. at various points in the electronic design of interest at various points in time. Like the DC steady-state behaviors described with reference to FIG. 3D, the transient behaviors may also be stored as a result set in an indexed data structure that may be queried, linked to, and associated with some or all of the indexed data structures and/or databases described herein.

Figure 4A:
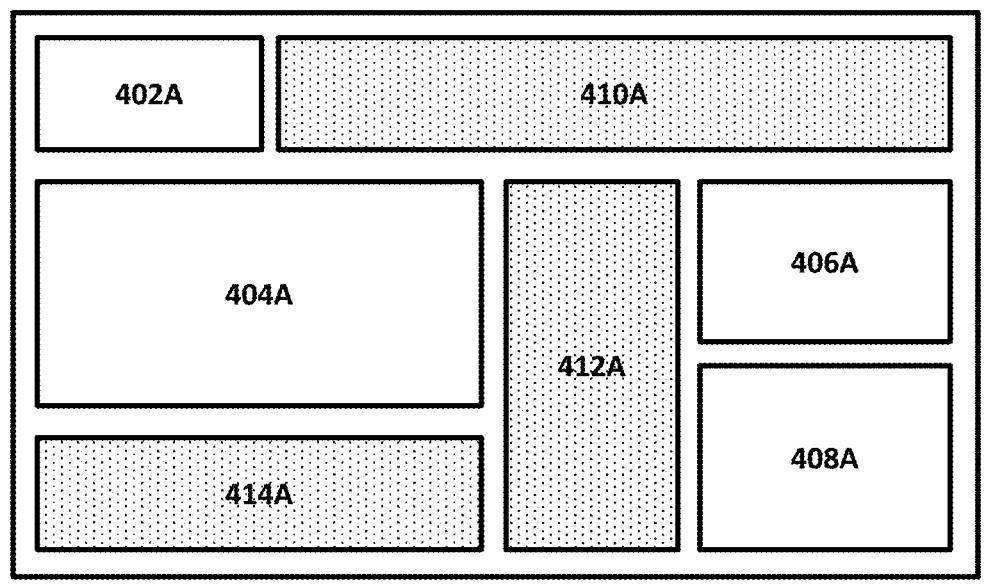
FIG. 4A illustrates a graphical example of a circuit activity map in some embodiments.

FIG. 4A illustrates a simplified graphical example of a circuit activity map in some embodiments. In this simplified graphical example, the circuit activity map indicates that the portions, nets, net segments, or individual devices 402A, 404A, 406A, and 408A are idle at certain point(s) in time, whereas the other portions, nets, net segments, or individual devices 410A, 412A, and 414A are active at the certain point(s) in time. As described herein, simplified circuit component models may be used in representing an idle portion, net, net segment, or individual device; and an analysis may "skip" idle portions, nets, net segments, or individual devices by maintaining their corresponding values during the analysis to conserve computational resource utilization (e.g., processor cycles, runtime, etc. in computation and memory footprint to maintain the state space and the changes therein).

FIG. 4B illustrates a simplified example of a circuit activity map stored in an indexed data structure in some embodiments. This simplified example of activity map 400B includes a first column 402B for portions, nets, net segments, or individual devices, a second column 404B for storing the names or identifications of the corresponding portions, nets, net segments, or individual devices, a third column 406B for storing the respective types of the portions, nets, net segments, or individual devices, and a fourth column 408B for storing the active or idle state of the corresponding nets, net segments, or individual devices.

This simplified example of activity map 400B may further include one or more additional columns for storing other data for each of the portions, nets, net segments, or individual devices. In addition or in the alternative, the indexed data structure may be optionally augmented to include one or more rows for each portion, net, net segment, or individual device for storing, for example, one or more nodal values at one or more nodes that belong to the portion, net, net segment, or individual device. In other embodiments, the indexed data structure may be augmented to a higher dimensionality by adding the corresponding nodes and their nodal values to each portion, net, net segment, or individual device in another dimension to create a higher-dimensional data structure without disturbing the original two-dimension data structure in the indexed data structure 400B.

The data structure may be indexed with a set of unique keys. For example, the name/identification column, if containing unique data, can be used to index the data structure illustrated in FIG. 4B. In some embodiments where the identifications or names of the portions, nets, net segments, or individual device are not unique, a set of unique keys may be constructed with the identifications or names by further combining, for example, the corresponding identifiers or names of the parent portion, hierarchy, net, net segment, device, or cell. This constructed set of unique keys may then be used to index the activity map and to link to other data structures (e.g., design databases, result set data structures, etc.)

System Architecture Overview

Figure 5:
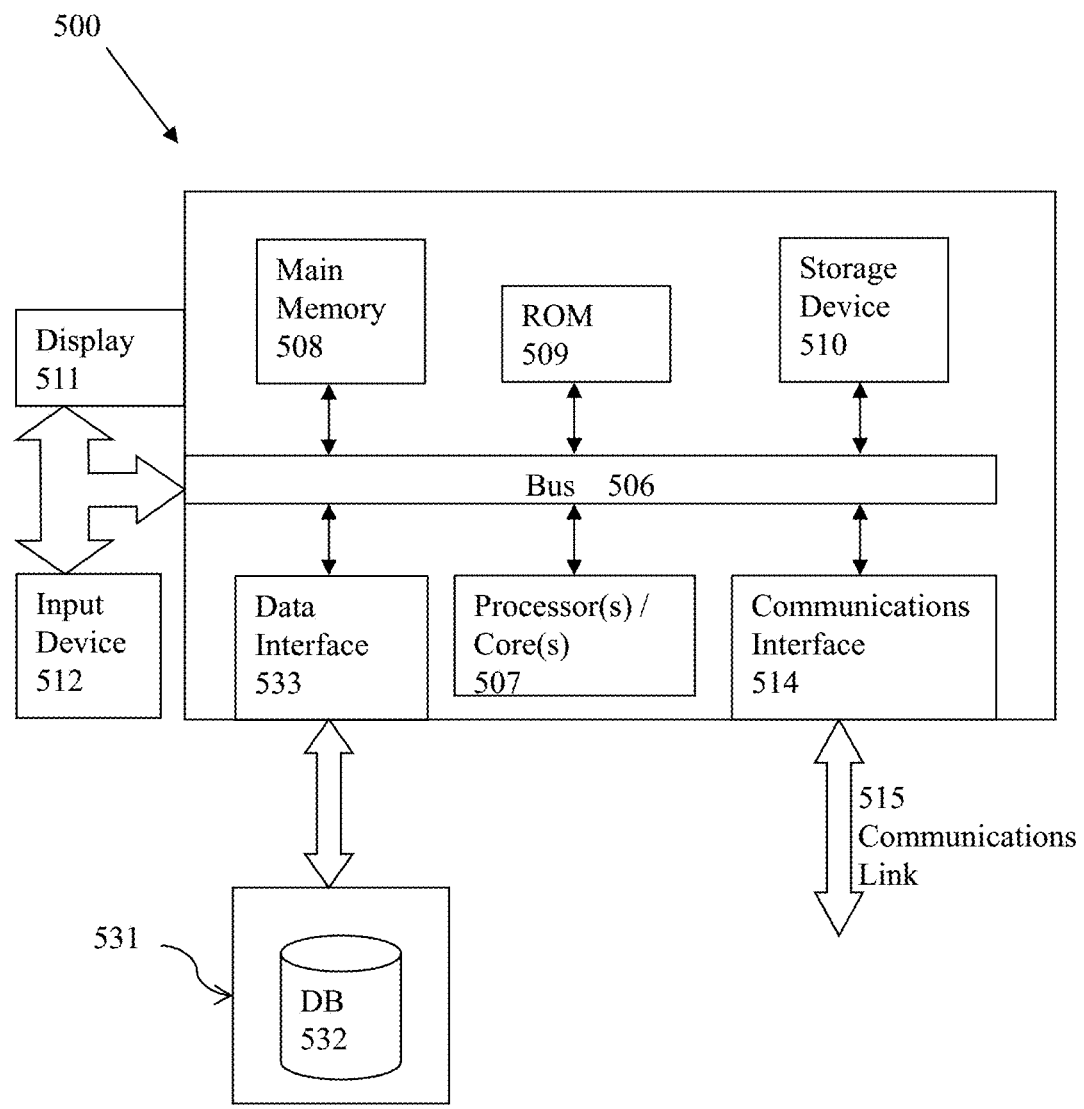
FIG. 5 illustrates a computerized system on which a process for implementing an electronic design using hybrid analyses may be implemented.

FIG. 5 illustrates a computerized system on which a process for implementing an electronic design with hybrid analyses may be implemented as described in the preceding paragraphs with reference to various figures. Computer system 500 includes a bus 506 or other communication module for communicating information, which interconnects subsystems and devices, such as processor 507, system memory 508 (e.g., RAM), static storage device 509 (e.g., ROM), disk drive 510 (e.g., magnetic or optical), communication interface 514 (e.g., modem or Ethernet card), display 511 (e.g., CRT or LCD), input device 512 (e.g., keyboard), and cursor control (not shown).

The illustrative computing system 500 may include an Internet-based computing platform providing a shared pool of configurable computer processing resources (e.g., computer networks, servers, storage, applications, services, etc.) and data to other computers and devices in a ubiquitous, on-demand basis via the Internet. For example, the computing system 500 may include or may be a part of a cloud computing platform in some embodiments.

According to one embodiment, computer system 500 performs specific operations by one or more processor or processor cores 507 executing one or more sequences of one or more instructions contained in system memory 508. Such instructions may be read into system memory 508 from another computer readable/usable storage medium, such as static storage device 509 or disk drive 510. In alternative embodiments, hard-wired circuitry may be used in place of or in combination with software instructions to implement the invention. Thus, embodiments of the invention are not limited to any specific combination of hardware circuitry and/or software. In one embodiment, the term "logic" and "module" shall mean any combination of software and/or hardware that is used to implement all or part of the invention. In these embodiments, to the extent a "module" or "logic" includes any software portion, at least a part of the software portion is stored in a non-transitory computer readable storage medium (e.g., random access memory or RAM) for execution by one or more processors or one or more processor cores.

Various actions or processes as described in the preceding paragraphs may be performed by using one or more processors, one or more processor cores, or combination thereof 507, where the one or more processors, one or more processor cores, or combination thereof executes one or more threads. For example, the act of extracting, the act of determining, the act of representing, the act of generating, the act of performing one or more analyses, etc. may be performed by one or more processors, one or more processor cores, or combination thereof.

The term "computer readable storage medium" or "computer usable storage medium" as used herein refers to any non-transitory medium that participates in providing instructions to processor 507 for execution. Such a medium may take many forms, including but not limited to, non-volatile media and volatile media. Non-volatile media includes, for example, optical or magnetic disks, such as disk drive 510. Volatile media includes dynamic memory, such as system memory 508.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 500. According to other embodiments of the invention, two or more computer systems 500 coupled by communication link 515 (e.g., LAN, PTSN, or wireless network) may perform the sequence of instructions required to practice the invention in coordination with one another.

Computer system 500 may transmit and receive messages, data, and instructions, including program, i.e., application code, through communication link 515 and communication interface 514. Received program code may be executed by processor 507 as it is received, and/or stored in disk drive 510, or other non-volatile storage for later execution. In an embodiment, the computer system 500 operates in conjunction with a data storage system 531, e.g., a data storage system 531 that includes a database 532 that is readily accessible by the computer system 500. The computer system 500 communicates with the data storage system 531 through a data interface 533.

A data interface 533, which is coupled to the bus 506 (e.g., memory bus, system bus, data bus, etc.), transmits and receives electrical, electromagnetic or optical signals that include data streams representing various types of signal information, e.g., instructions, messages and data. In embodiments of the invention, the functions of the data interface 533 may be performed by the communication interface 514.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing an electronic design with hybrid analyses, comprising:

generating, at one or more hybrid analysis modules including or functioning in conjunction with the at least one microprocessor and at least partially stored in a non-transitory computer readable storage medium of a computing system, an activity map for an electronic design at least by performing an analysis that characterizes an activity of the electronic design in response to an input stimulus;

reducing the electronic design into a reduced electronic design at least by applying, at the one or more hybrid analysis modules, a plurality of reduction processes to different portions of the electronic design based in part or in whole upon the activity map, wherein the activity map comprises activity data that corresponds to the activity of the electronic design in response to the input stimulus;

determining transient behaviors of the electronic design at least by performing one or more transient analyses on a representation of the electronic design with a simulation start point based in part or in whole upon the activity map; and implementing the electronic design for manufacturing at least by modifying or correcting the electronic design based at least in part upon the transient behaviors.

2. The computer implemented method of claim 1, further comprising:

identifying inputs for the electronic design; and generating the activity map at least by performing a pre-simulation on a first representation of the electronic design.

3. The computer implemented method of claim 2, further comprising:

identifying a plurality of circuit components in a netlist of the electronic design; and reducing the netlist into a reduced netlist at least by performing one or more operations on the plurality of circuit components.

4. The computer implemented method of claim 2, further comprising:

identifying one or more templates for representing a plurality of instances that are instantiated from one or more masters in the electronic design.

5. The computer implemented method of claim 3, further comprising:

generating the first representation for the reduced netlist using circuit component models corresponding to the reduced netlist at least by performing an operation of the one or more operations that shorts a plurality of parasitic resistors in the netlist;

identifying a set of stimuli as inputs to the first representation; and generating circuit activity data at least by performing the pre-simulation on the first representation.

6. The computer implemented method of claim 2, generating the activity map comprising:

identifying a netlist and a set of stimuli for the electronic design; and reducing the netlist into a reduced netlist.

7. The computer implemented method of claim 6, generating the activity map further comprising:

determining circuit activity data at least by performing the pre-simulation on the reduced netlist of the electronic design; and generating the activity map at least by populating at least some of the circuit activity data into a plurality of column structures of a data structure.

8. The computer implemented method of claim 6, generating the activity map further comprising:

determining or identifying a set of unique keys for the data structure;

indexing the data structure into an indexed data structure using at least the set of unique keys; and linking the activity map with the set of stimuli, the first representation of the electronic design, and the reduced netlist of the electronic design with one or more link structures.

9. The computer implemented method of claim 1, reducing the electronic design into the reduced electronic design comprising:

identifying a plurality of reduction modules that correspond to respective frequencies;

identifying a portion of the electronic design from a plurality of portions in the electronic design; and identifying corresponding circuit activity data that corresponds to the portion of the electronic design from the activity map.

10. The computer implemented method of claim 9, reducing the electronic design into the reduced electronic design comprising:

determining a reduction module for the portion of the electronic design from the plurality of reduction modules based in part or in whole upon the corresponding circuit activity data; and reducing the portion of the electronic design into a reduced portion at least by executing the reduction module on the portion of the electronic design.

11. The computer implemented method of claim 9, reducing the electronic design into the reduced electronic design comprising:

determining whether respective reduction modules that respectively correspond to the plurality of portions in the electronic design have been determined; and updating a first analysis database using at least the reduced portion.

12. The computer implemented method of claim 1, further comprising determining the simulation start point, determining the simulation start point further comprising:

simplifying the electronic design or the reduced electronic design into a simplified representation of the electronic design; and generating a system for analyzing the electronic design by using at least the simplified representation.

13. The computer implemented method of claim 12, further comprising determining the simulation start point, determining the simulation start point further comprising:

determining steady-state behaviors of the electronic design at least by performing a steady-state analysis on the system with a set of stimuli that is used in generating the activity map; and generating or updating a result set at least by populating at least some of the steady-state behaviors into a first data structure.

14. The computer implemented method of claim 13, further comprising determining the simulation start point, determining the simulation start point further comprising:

determining or identifying a first set of unique keys for the first data structure;

indexing the first data structure into a first indexed data structure using at least the first set of unique keys; and linking the first indexed data structure with the set of stimuli, the simplified representation of the electronic design with one or more link structures.

15. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for implementing an electronic design with hybrid analyses, the set of acts comprising:

generating, at one or more hybrid analysis modules including or functioning in conjunction with the at least one microprocessor and at least partially stored in a non-transitory computer readable storage medium of a computing system, an activity map for an electronic design at least by performing an analysis that characterizes an activity of the electronic design in response to an input stimulus;

reducing the electronic design into a reduced electronic design at least by applying, at the one or more hybrid analysis modules, a plurality of reduction processes to different portions of the electronic design based in part or in whole upon the activity map, wherein the activity map comprises activity data of the electronic design in response to an input stimulus;

determining transient behaviors of the electronic design at least by performing one or more transient analyses on a representation of the electronic design with a simulation start point based in part or in whole upon the activity map; and implementing the electronic design for manufacturing at least by modifying or correcting the electronic design based at least in part upon the transient behaviors.

16. The article of manufacture of claim 15, the set of acts further comprising:

identifying inputs for the electronic design;

generating the activity map at least by performing a pre-simulation on a first representation of the electronic design;

identifying a plurality of circuit components in a netlist of the electronic design;

reducing the netlist into a reduced netlist at least by performing one or more operations on the plurality of circuit components;

generating the first representation for the reduced netlist using circuit component models corresponding to the reduced netlist at least by performing an operation of the one or more operations that shorts a plurality of parasitic resistors in the netlist;

identifying a set of stimuli as inputs to the first representation; and generating circuit activity data at least by performing the pre-simulation on the first representation.

17. The article of manufacture of claim 15, the set of acts further comprising:

Identifying a netlist and a set of stimuli for the electronic design; and reducing the netlist into a reduced netlist;

determining circuit activity data at least by performing the pre-simulation on the reduced netlist of the electronic design;

generating the activity map at least by populating at least some of the circuit activity data into a plurality of column structures of a data structure;

determining or identifying a set of unique keys for the data structure;

indexing the data structure into an indexed data structure using at least the set of unique keys; and linking the activity map with the set of stimuli, the first representation of the electronic design, and the reduced netlist of the electronic design with one or more link structures.

18. A system for implementing an electronic design with hybrid analyses, comprising:

non-transitory computer accessible storage medium storing thereupon program code; and one or more hybrid analysis modules that function in conjunction with the at least one microprocessor and stored at least partially in a non-transitory computer readable storage medium of a computing system and are configured to execute the program code to generate an activity map for an electronic design at least by performing an analysis that characterizes an activity of the electronic design in response to an input stimulus;

the one or more hybrid analysis modules further configured to reduce the electronic design into a reduced electronic design at least by applying, at the one or more hybrid analysis modules, a plurality of reduction processes to different portions of the electronic design based in part or in whole upon the activity map, wherein the activity map comprises activity data of the electronic design in response to an input stimulus;

the one or more hybrid analysis modules further configured to determine transient behaviors of the electronic design at least by performing one or more transient analyses on a representation of the electronic design with a simulation start point based in part or in whole upon the activity map; and the one or more hybrid analysis modules further configured to implement the electronic design for manufacturing at least by modifying or correcting the electronic design based at least in part upon the transient behaviors.

19. The system of claim 18, further comprising:

the one or more hybrid analysis modules further configured to identify a plurality of reduction modules that correspond to respective frequencies;

the one or more hybrid analysis modules further configured to identify a portion of the electronic design from a plurality of portions in the electronic design;

the one or more hybrid analysis modules further configured to identify corresponding circuit activity data that corresponds to the portion of the electronic design from the activity map;

the one or more hybrid analysis modules further configured to determine a reduction module for the portion of the electronic design from the plurality of reduction modules based in part or in whole upon the corresponding circuit activity data; and the one or more hybrid analysis modules further configured to reduce the portion of the electronic design into a reduced portion at least by executing the reduction module on the portion of the electronic design.

20. The system of claim 18, further comprising:

the one or more hybrid analysis modules further configured to simplify the electronic design or the reduced electronic design into a simplified representation of the electronic design;

the one or more hybrid analysis modules further configured to generate a system for the electronic design by using at least the simplified representation;

the one or more hybrid analysis modules further configured to determine steady-state behaviors of the electronic design at least by performing a steady-state analysis on the system with a set of stimuli that is used in generating the activity map;

the one or more hybrid analysis modules further configured to generate or update a result set at least by populating at least some of the steady-state behaviors into a first data structure;

the one or more hybrid analysis modules further configured to determine or identify a first set of unique keys for the first data structure;

the one or more hybrid analysis modules further configured to index the first data structure into a first indexed data structure using at least the first set of unique keys; and the one or more hybrid analysis modules further configured to link the first indexed data structure with the set of stimuli, the simplified representation of the electronic design with one or more link structures.

* * * * *